United States Patent [19]

Yamada

[11] Patent Number: 4,582,046
[45] Date of Patent: Apr. 15, 1986

[54] MULTIPLE-PURPOSE ROASTER

[75] Inventor: Takeshi Yamada, Nagoya, Japan

[73] Assignee: Shinpo Kabushiki Kaisha, Nagoya, Japan

[21] Appl. No.: 632,772

[22] Filed: Jul. 20, 1984

[51] Int. Cl.[4] ............................................. F24C 15/20
[52] U.S. Cl. .............................. 126/299 R; 126/41 R; 98/115.1
[58] Field of Search .............. 126/299 R, 39 R, 39 C, 126/39 B, 39 K, 40, 299 D, 41 R, 214 C, 214 R, 212; 99/446, 444, 447; 98/115 R

[56] References Cited

U.S. PATENT DOCUMENTS

| | | | |
|---|---|---|---|
| 3,593,647 | 7/1971 | Copeland, Jr. | 126/41 R |
| 3,763,846 | 10/1973 | Schantz | 126/41 R |
| 4,291,668 | 9/1981 | Moeller | 126/41 R |
| 4,335,705 | 6/1982 | Kiyomitu | 126/41 R |

Primary Examiner—James C. Yeung
Attorney, Agent, or Firm—Flynn, Thiel, Boutell & Tanis

[57] ABSTRACT

A roaster has radially spaced outer and inner casings with a smoke outlet passage defined therebetween. The inner casing has an annular step extending along an inner peripheral surface thereof. A circular grill for roasting meat thereon or a circular trivet for supporting a "shab-shab" pot thereon is replaceably placed on the annular step in the inner casing.

6 Claims, 3 Drawing Figures

MULTIPLE-PURPOSE ROASTER

BACKGROUND OF THE INVENTION

1. Field of the Invention

The present invention relates to a multiple-purpose roaster having a grill and a trivel that are replaceable with each other for selective use as a meat roaster or a meat-boiling pot known as a "shab-shab" pot.

2. Description of the Prior Art

Prior roasters available on the market are designed for exclusive use for roasting meat. The roaster has a grill positioned above a burner in a roaster body. However, the grill cannot be replaced with another cooking means. Therefore, roasters for commercial use have been employed solely in restaurants where main dishes are grilled meat, but not in other restaurants. Home-use roasters also cannot be used in various ways of cooking other than roasting meat, one example being "shab-shab" in which thin slices of meat are boiled in a pot of boiling water.

SUMMARY OF THE INVENTION

It is an object of the present invention to povide a multiple-purpose roaster which can be used in different ways.

According to the present invention, there is provided a multiple-purpose roater comprising a cylindrical casing having an annular step extending along an inner peripheral surface thereof below an upper open end thereof, a burner disposed in the cylindrical casing below the annular step, and a grill and a trivet which are replaceable with each other and selectively placed on the annular step.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
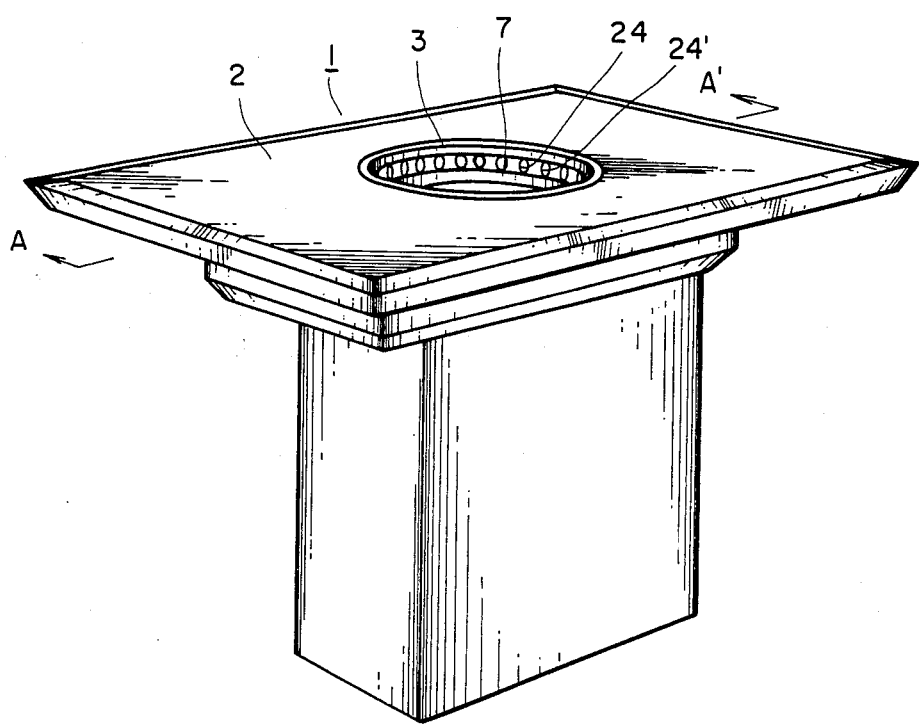
FIG. 1 is a perspective view of a multiple-purpose roaster according to the present invention.
Figure 2:
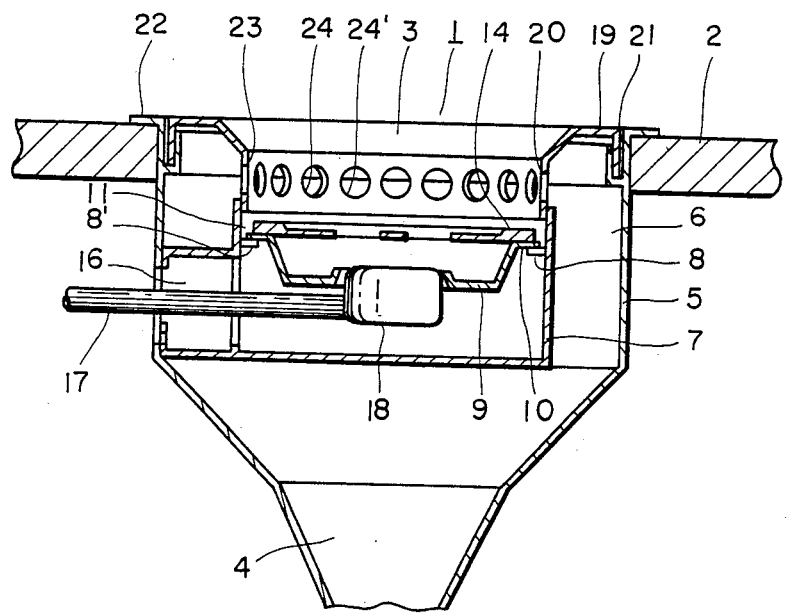
FIG. 2 is an enlarged fragmentary cross-sectional view taken along A—A' of FIG. 1.

As shown in FIG. 1, a roaster according to the present invention has a roaster body 1 including a table 2 having a substantially central circular opening 3. As illustrated in FIG. 2, the roaster comprises an outer cylindrical casing 5 fitted in the circular opening 3 and including a downwardly tapered smoke tube 4 connected to an appropriate smoke suction means (not shown). An inner cylindrical casing 7 is disposed centrally in the outer casing 5 with a smoke outlet passage 6 defined therebetween and communicating with the smoke tube 4.

The inner casing 7 has a plurality of circumferentially spaced teeth 8, 8' projecting radially inwardly from an inner peripheral surface thereof. A dish-shaped member 9 has an upper annular flange 10 extending radially outwardly from an outer peripheral edge thereof and placed on the teeth 8, 8'. The flange 10 on the teeth 8, 8' and the inner peripheral wall of the inner casing 7 define an annular step or shoulder 11 disposed below an upper open end of the inner casing 7.

Figure 3:
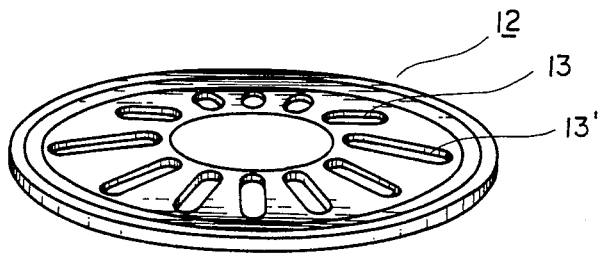
FIG. 3 is a perspective view of a grill and a trivet that can selectively be used in the multiple-purpose roaster.
Figure 3:
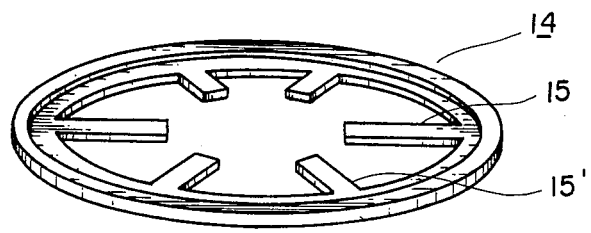

As shown in FIG. 3, a meat-roasting grill 12 is of a circular shape having a plurality of circumferentially equally spaced slots 13, 13' extending radially therein. A ring-shaped trivet or pot support 14 has a plurality of circumferentially equally spaced arms 15, 15' projecting radially inwardly thereform, the trivet 14 serving to support a "shab-shab" pot, for example. The grill 12 and the trivet 14 are of an outside diameter such that they can snugly fit in the inner casing 7. In use, either the grill 12 or the trivet 14 is placed on the step 11.

In FIG. 2, the outer and inner casings 5, 7 have radially aligned holes jointly defining a radial air inlet passage 16 for introducing air from outside of the outer casing 5 into the inner casing 7 below the member 9. A gas burner 18 is fixed to the bottom of the dish-shaped member 9 centrally within the inner casing 7. A gas tube 17 extends through the air inlet passage 16 and has an end connected to the gas burner 18.

A circular top member 19 is disposed in the opening 3 in the table 2 and has an sleevelike circular wall 23 extending downwardly into the upper open end of the inner casing 7, the circular wall 23 having a lower edge held against an upper inner peripheral surface of the inner casing 7 and defining a circular opening 20 communicating with the interior of the inner casing 7. The circular wall 23 has a plurality of round holes 24, 24' defined therein in circumferentially spaced relation and communicating with the smoke outlet passage 6 between the inner and outer casings 7, 5. The outer casing 5 has an upper flange 22 projecting radially outwardly from an upper edge thereof and resting on a circular marginal edge of the table 2 which defines the opening 3. The outer casing 5 also has an annular slot 21 defined radially inwardly of the upper flange 22 and receiving therein an annular wall extending downwardly from an outer peripheral edge of the top member 19.

In use, the grill 12 or the trivet 14 is selectively placed on the step 11. Where the grill 12 is employed, sliced pieces of meat can be roasted on the grill 12. Where the trivet 14 is used, a "shab-shab" pot for example can be placed on the trivet 14. Therefore, the roaster of the present invention can be used selectively as a meat roaster or a "shab-shab" cooker.

What is claimed is:

1. A roaster for cooking articles, comprising:

an inner cylindrical casing which is vertically oriented and has an open upper end and a closed lower end;

projection means fixed to and projecting radially inwardly from the inner peripheral surface of said inner cylindrical casing for defining an upwardly facing shoulder which is spaced downwardly from the open upper end of said inner casing;

a removable grill-like member positioned within said inner cylindrical casing and supported on said shoulder, said grill-like member being circular in shape so as to conform to the interior cross section of said inner casing;

an outer cylindrical casing which is vertically oriented and disposed in substantially concentric and surrounding relationship to said inner casing, said outer casing being spaced radially from said inner casing so as to define a smoke outlet passage therebetween, said outer casing having an upper end which is spaced upwardly relative to the open upper end of said inner casing;

a smoke exhausting tube connected to the lower end of said outer casing and communicating with said smoke discharge passage for withdrawing smoke therefrom for external discharge; and an annular top member mounted on the upper ends of said inner and outer casings and extending radially therebetween for closing off the upper end of said smoke discharge passage, said top member having a downwardly projecting circular sleevelike wall which extends downwardly into the open upper end of said inner casing for engagement therewith, said circular sleevelike wall having a plurality of circumferentially spaced openings extending therethrough for communication with said smoke discharge passage, said grill-like member being positioned below said circular sleevelike wall so that articles to be cooked as positioned on said grill-like member are externally surrounded by said sleevelike wall.

2. A roaster according to claim 1, including a burner positioned within said inner casing below said grill-like member, and an air inlet passage extending radially through said inner and outer casings and across the clearance space therebetween for communication with said inner casing in the vicinity of said burner.

3. A roaster according to claim 1, wherein said grill-like member includes both a grill and a trivet which are interchangeably positionable on said shoulder.

4. A roaster according to claim 1, wherein the upper end of said outer casing is open and includes structure which defines an annular groove which extends around the upper ends of said outer casing and opens upwardly, said top member including an annular wall part which extends substantially radially between said inner and outer casings, said annular wall part having said circular sleevelike wall fixed to the inner periphery thereof, said top member also having an annular sleevelike flange fixed to said annular wall part adjacent the outer periphery thereof and projecting downwardly therefrom, said sleevelike flange being accommodated within the upwardly opening annular slot formed adjacent the open upper end of said outer casing, whereby said top member effectively closes off the upper end of said smoke discharge passage as defined between said inner and outer casings except for the communication provided by said openings as formed in said circular sleevelike wall.

5. A roaster according to claim 4, including a substantially planar table top having a circular opening therein, said outer casing being positioned within said circular opening and projecting downwardly from said table top, said outer casing having the upper end thereof disposed within the opening formed in said table top, and means associated with said upper casing for stationarily supporting the upper casing on said table top.

6. A roaster according to claim 4, including a burner positioned within said inner casing below said grill-like member, an air inlet passage formed radially through said inner and outer casings and across the spacing therebetween for supplying air into the lower portion of said inner casing.

* * * * *